United States Patent [19]
Simpson

[11] Patent Number: 4,878,014
[45] Date of Patent: Oct. 31, 1989

[54] ION BEAM PROFILE SCANNER HAVING SYMMETRIC DETECTOR SURFACE TO MINIMIZE CAPACITANCE NOISE

[75] Inventor: Michael L. Simpson, Knoxville, Tenn.

[73] Assignee: Oak Ridge Associated Universities, Oak Ridge, Tenn.

[21] Appl. No.: 239,454

[22] Filed: Sep. 1, 1988

Related U.S. Application Data

[63] Continuation-in-part of Ser. No. 203,716, Jun. 7, 1988, abandoned.

[51] Int. Cl.$^4$ ............................................. G01N 27/00
[52] U.S. Cl. .................................. 324/71.3; 324/71.1
[58] Field of Search ...................... 324/71.1, 71.3, 72, 324/72.5; 315/111.81, 111.91, 85; 313/361.1; 250/305, 306, 315.3, 288; 174/35 R

[56] References Cited

U.S. PATENT DOCUMENTS

| | | | |
|---|---|---|---|
| 3,207,982 | 9/1965 | Rose | 324/71.1 |
| 3,268,812 | 8/1966 | Meyer et al. | 324/72 |
| 3,371,274 | 2/1968 | Davey | 324/71.1 |
| 3,419,718 | 12/1968 | Hammond et al. | 324/71.3 |
| 3,789,298 | 1/1974 | Herb | 324/71 |
| 3,924,124 | 12/1975 | Favre et al. | 250/281 |
| 4,317,995 | 3/1982 | Bradshaw et al. | 250/288 |
| 4,540,884 | 9/1985 | Stafford et al. | 250/282 |
| 4,650,999 | 3/1987 | Fies, Jr. et al. | 250/282 |

Primary Examiner—Gerard R. Strecker
Assistant Examiner—Jack B. Harvey
Attorney, Agent, or Firm—Luedeka, Hodges & Neely

[57] ABSTRACT

A beam profile scanner includes a probe constructed of a material that will emit electrons when struck by a particle beam such as an ion beam. The probe is passed through the ion beam and the electrons emitted by the probe are detected when they strike a detector surface that is configured and oriented to offer a substantially symmetric view to the moving probe in order to minimize changing capacitance noise. The detector surface is electrically connected to an analyzer circuit that monitors and further processes the current caused by electrons striking the dectector surface and that generates a signal corresponding to the ion beam profile. In the preferred embodiment, the detector surface is a circular metal plate charged to attract electrons emitted by the probe, and the symmetric view of the surface with respect to the probe helps to maintain noise at an acceptably low level. Also, preferably, a preamplifier is connected to and mounted proximate to the detector surface in a vacuum within a detector housing, and both the detector surface, amplifier and probe are disposed inside a grounded shield structure.

23 Claims, 1 Drawing Sheet

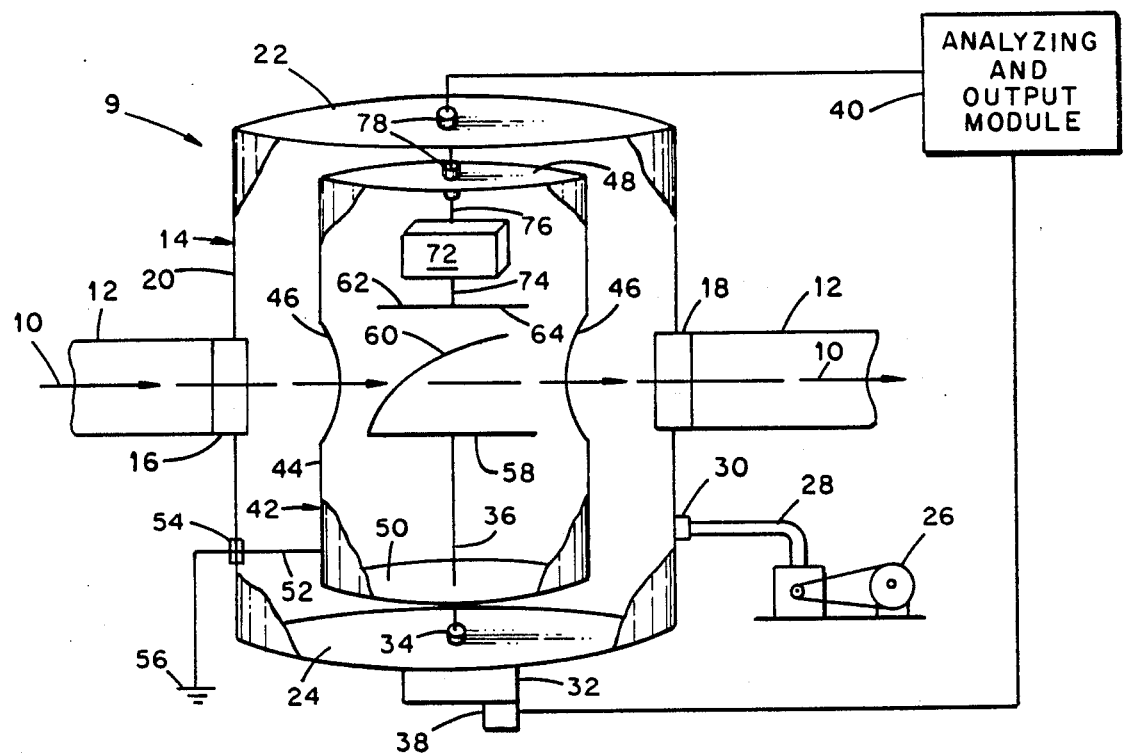

ION BEAM PROFILE SCANNER HAVING SYMMETRIC DETECTOR SURFACE TO MINIMIZE CAPACITANCE NOISE

FIELD

The present invention relates to apparatus for scanning the profile and intensity of particle beams and particularly relates to an apparatus having a charged surface for collecting electrons produced by the particle beam striking a target. This application is a Continuation-In-Part of U.S. application Ser. No. 07/203,716 filed June 7, 1988, now abandoned.

BACKGROUND

Ion beams are often used in the study of nuclear physics and are difficult to analyze because their intensity levels are low compared to environmental noise. Because of their low intensity levels, it is important to minimize the noise generated by scanners that are used in determining the profile of these beams.

Ion beam profile scanners, such as the one disclosed in U.S. Pat. No. 3,789,298, issued Jan. 29, 1974 to Herb, experience microphonic noise from sources such as the motion of the probe through the beam and pickup from line power. These noise sources have frequencies near the range of typical beam sample rates of 10–30 Hz. For this reason, microphonic noise is difficult to filter out from the desired signal.

In some prior art devices, such as the Herb patent referenced above, the detector is generally a cylinder coaxial with the ion beam and perpendicular with the axis of rotation of the probe. Using this detector construction, it was discovered that microphonic noise may be minimized by using an uncharged cylindrical detector. But, since charged particles are to be detected, using an uncharged detector places a severe limitation on the sensitivity of the detector. On balance, however, the loss in sensitivity was justified by the noise reduction of this design.

SUMMARY

In the present invention, a major source of microphonic noise has been recognized and a detector structure has been devised that significantly reduces noise compared to prior art devices and allows a charged detector surface. In accordance with the present invention, the particle beam profile scanner includes a probe constructed of a material that will emit electrons when struck by an particle beam. The probe is passed through the particle beam and, as a result, electrons are emitted by the probe in proportion to the number of particles striking the probe. The emitted electrons are detected by the detector which generates a signal proportional to the number of electrons detected. The surface of the detector is configured and oriented with respect to the moving probe such that the detector offers a substantially symmetric view to the probe.

Since the surface of the detector offers a substantially symmetric view to the probe as it moves, there will be very little or no change in capacitance between the probe and the detector as the probe changes position. Changing capacitance substantially contributes to microphonic noise, and because such changing capacitance is substantially reduced, there will be an increase in the signal to noise ratio of the detector.

One preferred embodiment of the invention provides for increasing the sensitivity of the detector by electrically charging the surface. Since electrons are to be detected, charging the surface of the detector with a positive charge will increase the number of electrons attracted to the surface. Also, since the detector surface is symmetric with respect to the probe, the charge on the plate does not cause a changing capacitance as the probe moves.

The preferred embodiment of the invention also employs a circular metal detector surface that is positioned to offer a substantially symmetric view to the probe as it moves in a circular manner. It is recognized, however, that a circular surface is not the only one that offers a substantially symmetric view to a rotating probe. An extended flat surface of any geometry, if sufficiently large, also appears substantially symmetric to a rotating probe. In such a case, there is no changing capacitance since the non-symmetric edges of the surface are too remote to affect the capacitance felt by the probe. Concave or convex spherical detector surfaces could also offer a substantially symmetric view to a rotating probe as well.

In the preferred embodiment, a preamplifier and the detector surface are mounted in a vacuum within a housing. The preamplifier is mounted very close to the detector surface to decrease the triboelectric noise due to vibrating signal lines. Noise in the preferred ion beam profile scanner is further reduced by providing a grounded shield that is configured to allow passage of the ion beam. The shield minimizes interferences from external sources.

BRIEF DESCRIPTION OF THE DRAWING

This invention will be more clearly understood from the following Detailed Description of the preferred embodiment and when considered in conjunction with the accompanying drawing in which a side schematic view of the ion beam profile scanner is shown.

DETAILED DESCRIPTION OF THE DRAWING

The preferred form of the invention is schematically represented in the drawing as scanner 9 in which an ion beam 10 is traveling down an ion beam passage tube 12 and into the ion beam profile scanner housing 14 through an entry port 16. The housing 14 is cylindrical with its axis oriented perpendicular to the ion beam 10 and the entry port 16 and an exit port 18 are oppositely disposed in a cylindrical side wall 20 of the housing 14 to allow passage of the ion beam 10 through the housing 14. A top surface 22 and bottom surface 24 serve to close the housing 14, and a substantial vacuum is maintained in housing 14 by a vacuum pump 26 connected by vacuum tubing 28 and a vacuum connection 30 to the housing 14.

Attached to the bottom surface 24 of housing 14 is motor 32 with a magnetic coupling 34 to provide drive power to shaft 36 in the interior of the housing 14. Motor 32 is provided with a magnetic pickup 38 which sends motor speed information to signal analyzing circuits 40.

In the preferred mode a shield 42 is mounted in the interior of the housing 14. The shield 42 is composed of a cylindrical side wall 44 aligned coaxially with the housing side wall 20. The shield side wall 44 has two openings 46 oppositely disposed to allow complete passage by the ion beam 10, and a top surface 48 and bottom surface 50 serve to close the shield 42. The shield may be grounded with wire 52, connection 54 in side wall 20 of housing 14, and electrical ground 56.

Shaft 36 mentioned above is oriented along the axes of the housing 14 and shield 42. The shaft 36 travels from the magnetic coupling 34 on the bottom surface 24 of the housing 14 through the bottom surface 50 of the shield 42 up to the center of a crossarm 58. Crossarm 58 is perpendicular to shaft 36 and is located just below the path of ion beam 10 through shield 42. In the preferred mode, a curved wire probe 60 is mounted on one end of crossarm 58.

The curved wire probe 60 is configured so that it makes an oblique angle with the axis of the ion beam 10. When the curved wire probe 60 is rotated, it passes through the ion beam 10 twice each revolution. Due to the configuration of the curved wire probe 60, it sweeps across the ion beam 10 at different angles during each pass.

The curved wire probe 60 is constructed of material to emit electrons when struck by the ion beam 10. The total number of electrons emitted by curved wire probe 60 is proportional to the total number of ions in ion beam 10 that strike the curved wire probe 60.

The electrons emitted by the curved wire probe 60 are detected by the detector 62 which generates a signal proportional to the number of electrons detected. The surface 64 of the detector 62 is configured and oriented so that it offers a substantially symmetric view to rotating curved wire probe 60. As the curved wire probe 60 rotates through the ion beam 10 it has an unvarying view of the surface 64 of the detector. In the preferred mode, the surface 64 is a circular metal disc which is positively charged to attract the electrons. The surface 64 is charged by applying a bias voltage to the preamplifer 72 which in turn charges the surface 64.

Placing a charge on surface 64 produces a capacitance between the surface 64 and the curved wire probe 60. If the capacitance changes as the curved wire probe 60 rotates, noise will be introduced into the detection signal. The detector 62 will see a change in capacitance unless the surface 64 shows no change to the curved wire probe 60. With a surface 64 that offers a substantially symmetric view to the curved wire probe 60 there is substantially reduced changing capacitance.

A preamplifier 72 is mounted inside the housing 14 and the shield 42 close to the detector 62 in order to minimize the triboelectric effect noise caused by the vibrations in the connecting wires 74 between the detector 62 and the preamplifier 72 and, thus, one result of mounting the preamplifier 72 in the substantial vacuum of the housing 14 is to decrease the inherent noise of the preamplifier 72. The preamplifier 72 amplifies the signal from the detector 62, and the signal from the preamplifier 72 is sent to signal analyzing circuits and output module 40 through wires 76 and connections 78 through the shield 42 and the housing 14. The magnetic pickup 38 also generates a signal corresponding to the movement and position of the wire probe 60 and this signal is applied to the analyzing circuits and output module 40. The module 40 uses the signals from the preamplifier 72 and the magnetic pickup 38 to determine the profile contour of the ion beam 10 and to generate and display a signal corresponding to the ion beam profile. In the preferred embodiment, module 40 includes analog input amplifiers for receiving both signals, analog to digital converters for converting the signals to digital form, a computer for analyzing the signals and producing a digital profile signal corresponding to the ion beam profile, a video display for graphically displaying the ion beam profile, a magnetic memory for storing raw data and the profile signal, and an output port for outputting data and the profile signal. All of this equipment is well-known in the art and analog equipment may also be substituted into module 40 to perform the same function.

From the foregoing discussion, it will be appreciated that the present invention provides a geometry that reduces noise in an ion beam profile scanner to the point that it is advantageous to charge the electron detector surface 64. In addition, mounting the preamplifier 72 proximate to the detector 62 reduces noise caused by vibrating signal lines and the inherent noise of the preamplifier 72 is reduced by mounting it in the substantial vacuum of housing 14. The further mounting of a shield 42 within housing 14 reduces noise from external sources other than ion beam 10. The net effect is that the present invention greatly reduces the noise inherent in prior art scanners while being able to maintain the sensitivity of a charged detector surface 64.

What is claimed:

1. A particle beam profile scanner for scanning the profile of a particle beam, comprising:

a probe constructed of a material that will emit electrons when struck by the particle beam;

drive means for passing said probe through the particle beam whereby said probe, when struck by the particle beam, emits electrons in proportion to the number of particles striking said probe;

detection means for detecting the electrons emitted from said probe;

means for applying a positive charge to said detection means so that electrons emitted from said probe are attracted to and received by said detection means;

a surface disposed on said detection means and being configured and oriented with respect to said probe to minimize changing capacitance noise, said surface being configured and oriented to offer a subbstantially symmetric view to said probe as said probe moves through the particle beam;

circuit means connected to said surface for carrying an electric current that is comprised of the electrons emitted from said probe and received by said detection means; and output means for receiving the electric current from the circuit means and for generating output data corresponding to the electric current.

2. The particle beam profile scanner of claim 1 wherein said surface of said detection means further comprises a circular metal surface.

3. The particle beam profile scanner of claim 1 further comprising a sealed housing having substantially a vacuum therein; and a preamplifier disposed in the vacuum and in said housing and being connected to said circuit means.

4. The particle beam profile scanner of claim 1 further comprising:

analytical means for analyzing said current from said circuit means to determine the particle beam profile and for producing a profile signal corresponding to the particle beam profile; and said output means being connected to said analyzing means for producing and outputting information corresponding to the profile signal.

5. The particle beam profile scanner of claim 1 further comprising a grounded shield configured to allow passage of the particle beam therethrough and minimize interference from external sources.

6. A particle beam profile scanner for scanning the profile of a particle beam traveling along a path comprising:
   a housing for containing a substantial vacuum;
   means for producing and maintaining said substantial vacuum in said housing;
   a probe consisting of a material that will emit electrons when struck by the particle beam;
   drive means mounted in said housing and connected to said probe for passing said probe through the particle beam whereby said probe, when struck by the particle beam, emits electrons in proportion to the number of particles striking said probe;
   at least one port in said housing positioned to allow entry by the particle beam into said housing;
   detection means mounted ins aid housing means for detecting the electrons emitted from said probe;
   a surface disposed on said detection means and being configured and oriented with respect to said probe to minimize changing capacitance noise, said surface being configured and oriented to offer a substantially symmetric view to said probe as said probe moves through the particle beam;
   circuit means connected to said surface for carrying an electric current that is comprised of the electrons emitted from said probe and received by said detection means; and
   output means for receiving the electric current from the circuit means and for generating output data corresponding to the electric current.

7. The particle beam profile scanner of claim 6 wherein the detection means includes means for electrically charging said surface to attract the electrons emitted from said probe.

8. The particle beam profile scanner of claim 7 wherein said surface of said detection means further comprises a circular metallic surface mounted in said housing.

9. The particle beam profile scanner of claim 6 further comprising a grounded shield mounted in said housing configured to allow passage of the particle beam therethrough and minimizing interference from external sources.

10. The particle beam profile scanner of claim 6 further comprising a preamplifier disposed in said substantial vacuum in said housing and being connected to said detection means for generating an amplified signal corresponding to the number of electrons emitted from said probe.

11. The particle beam profile scanner of claim 10 further comprising:
    analytical means to analyze said signal from said preamplifier including amplification means and signal processing means to amplify and process said signal from said preamplifier; and
    display and recording means connected to said analyzing means to display and record the signal from said analyzing means.

12. A particle beam profile scanner for scanning the profile of a particle beam comprising:
    a probe constructed of a material that will emit electrons when struck by the particle beam, said probe formed into a curved wire for crossing the particle beam in vertical and horizontal directions;
    drive means for rotating and passing said probe through the entire particle beam so that said probe scans both vertically and horizontally through the beam and said probe when struck by the particle beam emits electrons in proportion to the number of particles striking said probe;
    detections means for detecting the electrons emitted from said probe;
    a surface disposed on said detection means and being configured and oriented with respect to said rotating probe to minimize changing capacitance noise, said surface being configured and oriented to offer a substantially symmetric view to said probe as said probe rotates and passes through the particle beam;
    circuit means connected to said surface for carrying an electric current that is comprised of the electrons emitted from said probe and received by said detection means; and
    output means for receiving the electric current from the circuit means and for generating output data corresponding to the electric current.

13. The particle beam profile scanner of claim 12 wherein the detection means includes means for electrically charging said surface to attract the electrons emitted from said probe.

14. The particle beam profile scanner of claim 13 wherein said surface of said detection means further comprises a circular metal surface.

15. The particle beam profile scanner of claim 12 further comprising:
    a sealed housing having a substantial vacuum therein; and
    a preamplifier disposed in the substantial vacuum in said housing and being connected to said detection means producing an amplified signal.

16. The particle beam profile scanner of claim 15 further comprising:
    analytical means to analyze said signal from said preamplifier including amplification means and signal processing means to amplify and process said signal from said preamplifier; and
    a display and recording means connected to said analytical means to display and record the signal from said analytical means.

17. The particle beam profile scanner of claim 12 further comprising a grounded shield configured to allow passage of the particle beam therethrough and minimize interference from external sources.

18. A method of determining the profile of a particle beam which comprises the steps of:
    passing a probe through the particle beam;
    striking said probe by the particle beam;
    emitting electrons from said probe in proportion to the number of particles striking said probe;
    configuring and orienting a surface disposed on a detection means with respect to said probe to minimize changing capacitance noise, said surface offering a substantially symmetric view to said probe;
    collecting and detecting at least part of the electrons from said probe on said surface means;
    connecting an electric circuit directly to said surface and producing an electric current in the circuit comprised of the electrons emitted from said probe; and
    producing output information corresponding to the electric current in the circuit.

19. The method of claim 18 further comprising the step of electrically charging said surface and attracting the electrons emitted from said probe.

20. The method of claim 19 wherein the step of configuring and orienting said surface disposed on said detection means is configuring and orienting a circular metal surface offering a substantially symmetric view to said probe.

21. The method of claim 18 further comprising the step of connecting a preamp to said surface and producing a preamp signal corresponding to the number of electrons collected on said surface.

22. The method of claim 21 further comprising the step of analyzing said preamp signal and producing a profile signal indicative of the particle beam profile; and outputting information corresponding to the profile signal and indicating the particle beam profile.

23. The method of claim 18 further comprising of the step of grounding a shield, configuring said shield allowing passage of the particle beam therethrough minimizing interference from external courses.

* * * * *